United States Patent
Sano

[11] Patent Number: 5,620,064
[45] Date of Patent: Apr. 15, 1997

[54] DISK BRAKE HAVING A HIDDEN CLIP FOR A BRAKE PAD PIN

[75] Inventor: Takashi Sano, Yamanashi-ken, Japan

[73] Assignee: Tokico Ltd., Kanagawa-ken, Japan

[21] Appl. No.: 454,530

[22] Filed: May 30, 1995

[30] Foreign Application Priority Data

May 31, 1994 [JP] Japan .................................. 6-141154

[51] Int. Cl.6 ............................. F16D 55/22; F16D 65/04
[52] U.S. Cl. .................................... 188/73.44; 188/73.45
[58] Field of Search ............................ 188/73.32, 73.31, 188/73.33, 73.34, 73.35, 73.36, 73.37, 73.38, 73.44, 73.45

[56] References Cited

U.S. PATENT DOCUMENTS

| | | | |
|---|---|---|---|
| 3,897,858 | 8/1975 | Toshida et al. | 188/73.45 |
| 4,511,019 | 4/1985 | Marianu | 188/73.45 |
| 4,518,798 | 12/1983 | Johannesen | 188/73.35 |
| 5,111,915 | 5/1992 | Rupprecht | 188/73.45 |

FOREIGN PATENT DOCUMENTS 2022733  12/1979  United Kingdom ............... 188/73.37

*Primary Examiner*—Matthew C. Graham
*Attorney, Agent, or Firm*—Wenderoth, Lind & Ponack

[57] ABSTRACT

A disk brake comprises a caliper including a claw portion, a pair of pads including back plates, a pin slidably supporting the pads, and a clip for preventing removal of the pin from the disk brake. The claw portion includes at its side end a first extension. One of the back plates includes at its side end a second extension. The clip is provided between the first and second extensions. The first and second extensions are of such a size as to cover the clip. The first extension includes a projecting portion for covering the upper side of the clip. The first and second extensions and the projecting portion cover the clip so that locating the clip from the outside of the disk brake is difficult, thus preventing removal of the clip.

14 Claims, 6 Drawing Sheets

DISK BRAKE HAVING A HIDDEN CLIP FOR A BRAKE PAD PIN

BACKGROUND OF THE INVENTION

1. Field of the Invention

The present invention relates to disk brakes for braking vehicles, and more particularly to disk brakes for braking two-wheeled vehicles.

2. Description of the Related Art

In the past, disk brakes for two-wheeled vehicles were constructed as shown in FIGS. 10–12. In the drawings, a U-shaped carrier 1 is fixed to a non-rotation portion (not shown) of a two-wheeled vehicle. A caliper 2 is floatingly supported on the carrier 1. A disk 3 is fixed to an axle hub 4 of the vehicle (FIG. 11). The caliper 2 comprises a cylinder portion 6 including a piston 5, an upper portion 7 extending from the cylinder portion 6 and crossing the disk 3, a claw portion 8 extending radially inwardly of the disk 3 from the upper portion 7, and a pair of arm portions 9 extending in right and left directions from the cylinder portion 6. One of the arm portions 9 is provided at the entrance side of the disk 3 and the other is provided at the exit side thereof. The entrance side arm portion 9 includes a through hole. The exit side arm portion 9 includes a blind hole. The carrier 1 includes support pins 11. One of the support pins 11 extends from the carrier 1 into the through hole of the entrance side arm portion 9. The carrier 1 also includes a bag-shaped flexible bush 10 covering the support pin 11 extending into the through hole of the entrance side arm portion 9. The bush 10 extends outwardly through the through hole of the entrance side arm portion 9. A portion of the bush 10 is attached to the inner wall of the through hole of the entrance side arm portion 9. The through hole of the entrance side arm portion 9 slidably receives the support pin 11 through the bush 10. The blind hole of the exit side arm portion 9 directly slidably receives the support pin 11. Thus the caliper 2 is slidably received on the support pins 11 and is floatingly supported by the carrier 1. Incidentally, 1a designates an attachment hole for mounting the carrier 1 on the vehicle.

The claw portion 8 of the caliper 2 includes a through hole 12 at its proximal and central portion. A pad supporting pin 13 is inserted into the through hole 12. The pin 13 extends from the face of the claw portion 8 through the through hole 12 to a hole 14 provided in the cylinder portion 6, and slidably supports a pair of pads 15 and 16. Each of the pads 15 and 16 comprises a back plate 17 and a lining 18. The lining 18 is integrally molded as one unit and is mounted on the surface of the back plate 17. Each of the back plates 17 includes a through hole 17a. The pin 13 is inserted into the through holes 17a of the back plates 17 and the back plates 17 are slidably supported on the pin 13. The pad 15 is provided close to the piston 5. The piston side pad 15 is supported at one end thereof on the pin 13. The piston side pad 15 is supported at the other end thereof on a step portion 19 (shown in FIG. 10) provided in the carrier 1. The pad 16 is provided close to the claw portion 8. The claw side pad 16 is supported at one end thereof on the pin 13. The claw side pad 16 is supported at the other end thereof on a pin 20 (shown in FIG. 12) mounted on one of the arm portions 9 of the caliper 2. Incidentally, the pin 20 is disposed in coaxial relation to the support pin 11 (shown right and upwardly of FIG. 12).

Pumping oil into the cylinder 6a of the cylinder portion 6 allows the piston 5 to be moved toward the disk 3, thereby permitting the pad 15 to be pressed against one face of the disk 3. In reaction thereto, the caliper 2 is moved relative to the piston 5 so that the pad 16 is pressed against the other face of the disk 3, thereby generating braking power for braking the vehicle. Incidentally, a reference numeral 21 shown in FIG. 11 designates a bleeder for discharging air collected within the cylinder 6a.

The supporting pin 13 includes at the outwardly extending end thereof a flange 22 to be in contact with the claw portion 8. The contact of the flange 22 with the claw portion 8 prevents insertion of the supporting pin 13 into the through hole 12. A clip 23 is mounted on the supporting pin 13 between the claw portion 8 and the back plate 17 of the pad 16, thereby preventing removal of the supporting pin 13 from the through hole 12. The clip 23 is referred as "β clip". As shown in FIG. 12, the clip 23 includes a linear portion 23a to be received in a radially extending hole of the supporting pin 13, and an S-shaped curved portion 23b to be in engagement with the periphery of the supporting pin 13. Fastening the clip 23 to the supporting pin 13 in a snap-clamping connection by the linear portion 23a and the curved portion 23b prevents removal of the clip 23 from the supporting pin 13. Providing the clip 23 in the proximal and central portion of the claw portion 8 of the caliper 2 permits the clip 23 to be covered with the upper portion 7 and the claw portion 8 with the disk brake being mounted on the vehicle, thereby making location of the clip 23 from the outside of the disk brake difficult. This prevents tampering such as removal of the clip 23 and enhances the design of the disk brake in the outward form thereof.

According to the above common disk brake, since space "S" for housing the clip 23 is defined centrally inside of the claw portion 8 of the caliper 2 and the upper portion 7 of the caliper 2 is lengthened more to create the space "S", the size of the upper portion 7 is required to be increased in thickness in order to ensure a desired rigidity of the caliper 2. Thickening the upper portion 7 makes the caliper 2 large and heavy. Therefore, measures have been employed recently in which the mounting position of the supporting pin 13 is changed from the proximal and central portion of the claw portion 8 of the caliper 2 to the side end of the caliper 2 to reduce the thickness of the upper portion 7 without compromising the rigidity of the caliper 2. However, the construction permits the clip 23 for preventing removal of the supporting pin 13 to be easily located from the outside of the caliper 2 so that tampering with, such as by removal of, the clip 23 is possible. Such a construction also lowers the design of the disk brake in the outward form thereof.

In order to remove the drawback, a disk brake employing measures in which the mounting position of the supporting pin 13 is changed to the side end of the caliper 2 include means for fixing the support pin to the caliper in a screw-tightening manner instead of mounting of the support pin on the caliper in the clip-fastening manner. However, to enable screw-tightening, machining is necessary for forming a thread of a screw on the support pin and the caliper, thereby increasing the production costs thereof. In particular, such machining results in losing the merit of the production costs that are brought about by the caliper being integrally molded as one unit.

SUMMARY OF THE INVENTION

In view of the drawbacks of the related art, it is an object of the present invention to provide a disk brake including a construction in which a pad supporting pin is mounted on the side end of a caliper in a clip-fastening manner so that a clip can not be located from the outside of the disk brake.

To this end, the present invention provides a disk brake comprising a caliper including a claw portion, the claw portion including a side end and at the side end thereof a first extension extending outwardly therefrom. A pair of pads each include back plates, one of the back plates including a side end and at the side end there is a second extension extending outwardly therefrom. A pin slidably supports the pads and is received in the first and second extensions. A clip is provided between the first and second extensions for preventing removal of the pin from the first and second extensions. The clip is covered with the first and second extensions so that the clip is not capable of being located from the outside of the disk brake.

The invention also provides a disk brake adapted to be mounted on a vehicle including a non-rotation portion and a disk, comprising a carrier fixedly connected to a non-rotation portion of a vehicle. A caliper is floatingly supported by the carrier and includes a cylinder portion and a claw portion. The cylinder portion and the claw portion face each other across the disk. One of the cylinder portion and the claw portion includes a first side end, the first side end having a first extension extending therefrom in the rotational direction of the disk, and the first extension having a first through hole. A pair of pads includes back plate. One of the back plates adjacent to one of the cylinder portion and the claw portion includes a second side end, the second side end having a second extension extending therefrom in the rotational direction of the disk, and the second extension having a second through hole. A pin slidably supports the pads and is inserted into the first and second through holes of the first and second extensions. A clip mounted on the pin between the first and second extensions for preventing removal of the pin from the through holes includes an upper side. The first and second extensions are of such a size as to cover the clip, and the first extension includes a projecting portion for covering the upper side of the clip.

In the disk brake constructed as mentioned above, the clip for preventing removal of the pin is covered with the first and second extensions, thus provided in a blind spot as viewed in the right and left directions of the vehicle from the outside thereof. The clip is also covered with the projecting portion so as to be in a blind spot as viewed from the upper outside of the vehicle. This construction allows location of the clip to be difficult from the outside of the caliper to prevent removal of the clip by tampering, Other features and advantages of the invention will become apparent to those skilled in the art from the following detailed description, claims, and drawings.

DESCRIPTION OF THE PREFERRED EMBODIMENTS

Embodiments of the present invention will be described below in detail with reference to the accompanying drawings.

Figure 6:
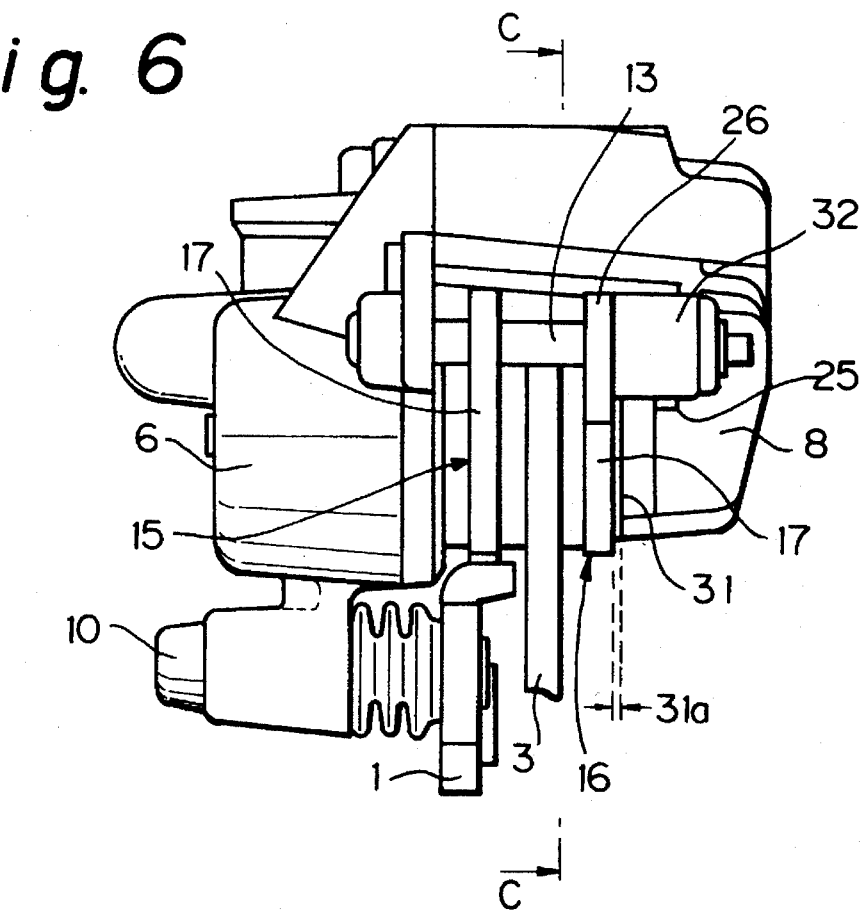
FIG. 6 is a side view illustrating the construction of a second embodiment of the disk brake according to the present invention.
Figure 8:
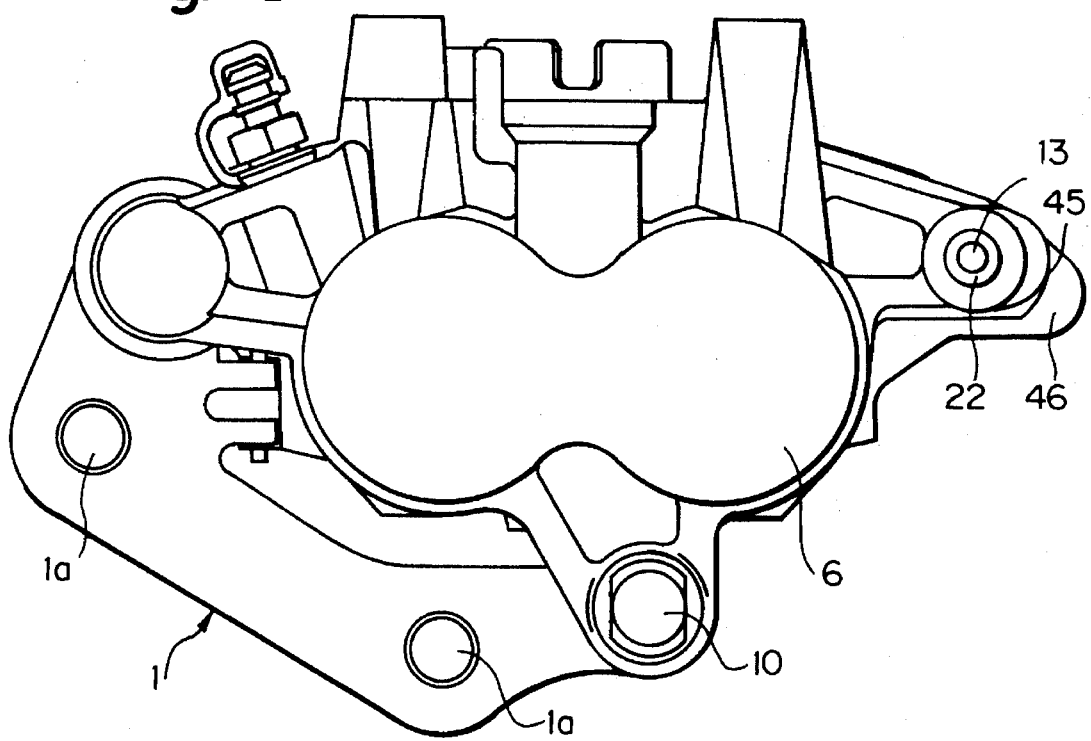
FIG. 8 is a front view illustrating the entire construction of a third embodiment of the disk brake according to the present invention.
Figure 9:
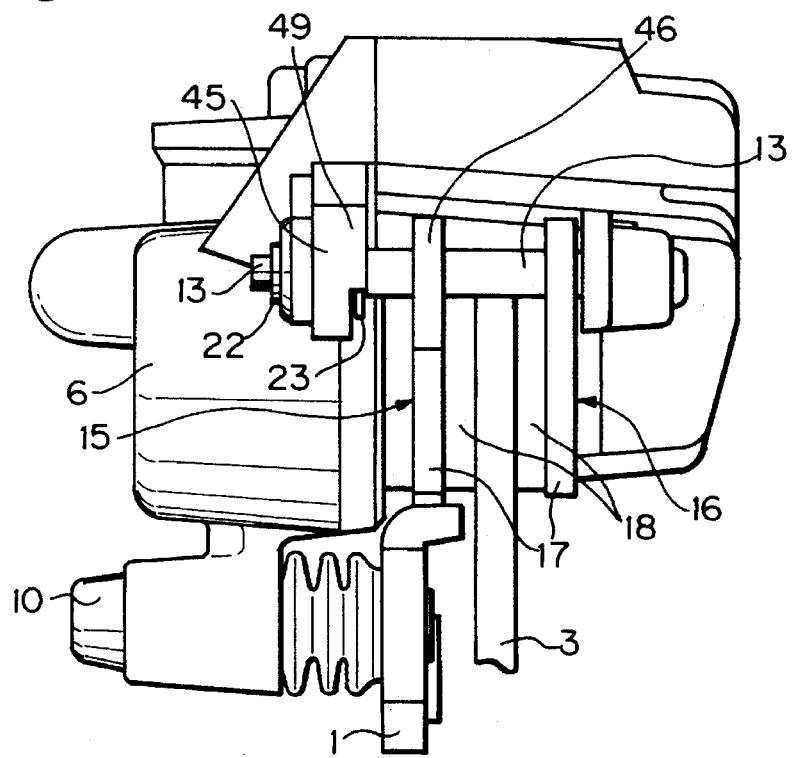
FIG. 9 is a side view illustrating the entire construction of the disk brake shown in FIG. 8.
Figure 7:
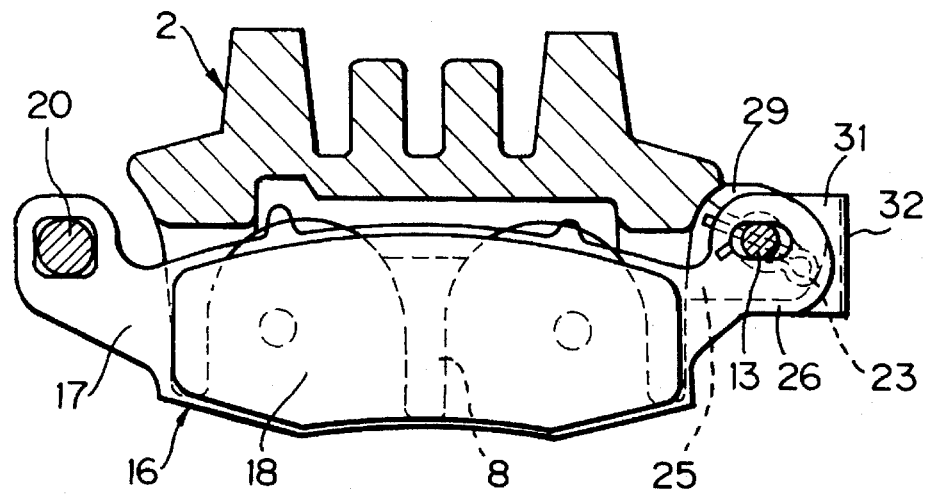
FIG. 7 is a sectional view as seen along line C—C of FIG. 6.
Figure 10:
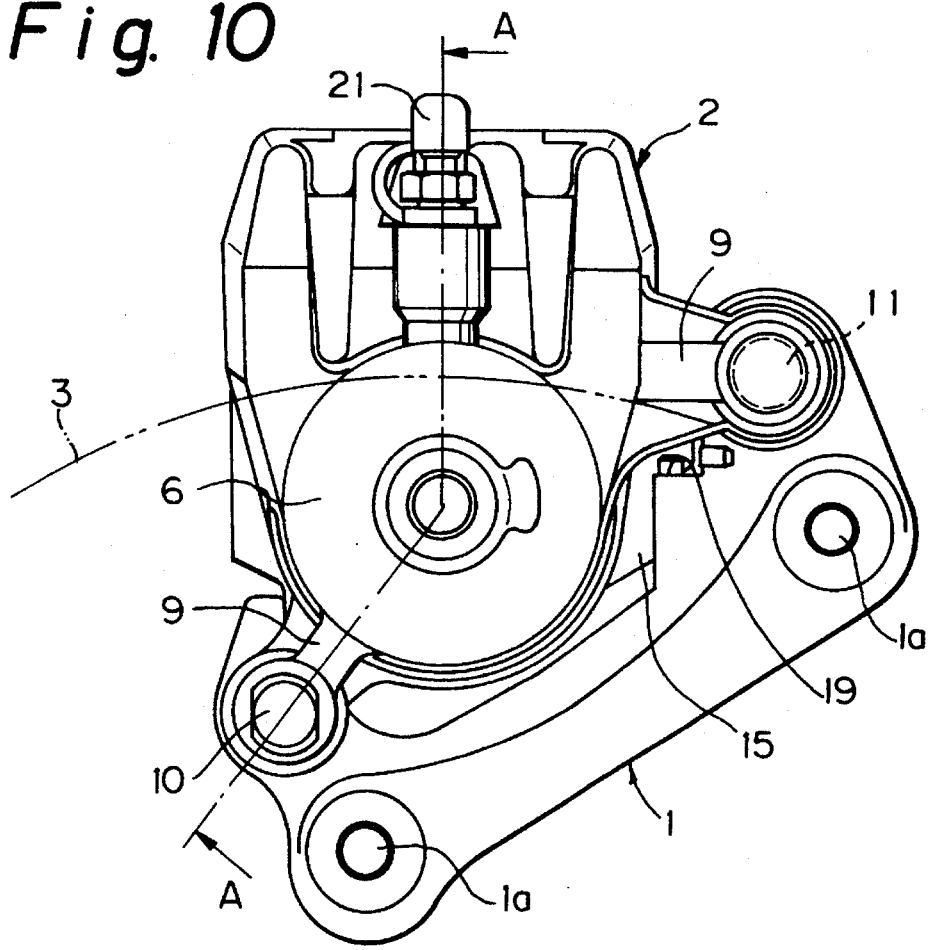
FIG. 10 is a front view showing the entire construction of a disk brake in the related art.
Figure 11:
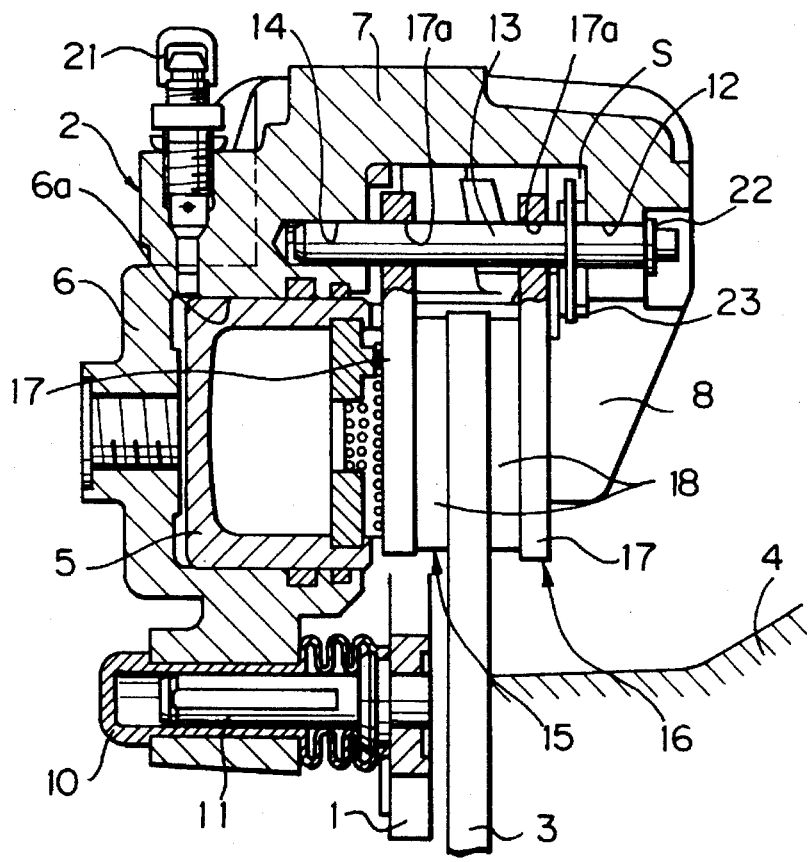
FIG. 11 is a sectional view as seen along the line A—A of FIG. 10.
Figure 12:
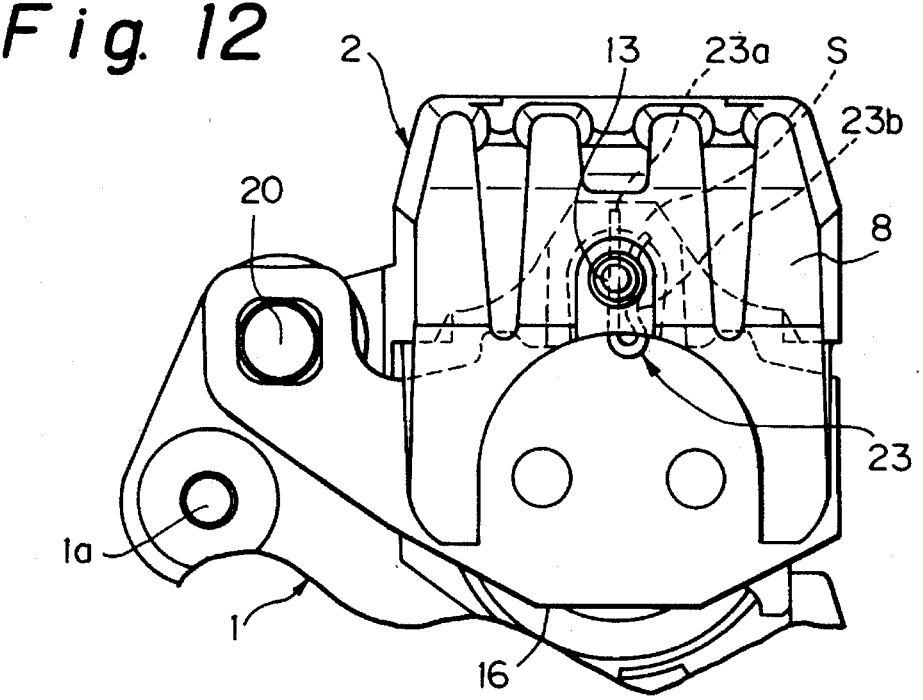
FIG. 12 is a rear view showing the entire construction of the disk brake in the related art.

FIGS. 1–5 show a first embodiment of the disk brake according to the present invention. FIGS. 6 and 7 show a second embodiment of the disk brake according to the present invention. FIGS. 8 and 9 show a third embodiment of the disk brake according to the present invention. Incidentally, though the subject of the first, second and third embodiments of the present invention is a two piston type disk brake, the basic construction of the embodiments is the same as that of the above related art as shown in FIGS. 10–12, with the exception of the embodiments including two pistons. Accordingly, corresponding elements are denoted by the same reference numerals, and explanation with respect to the corresponding elements is omitted. In the first embodiment, the claw portion 8 of the caliper 2 includes, at a side end thereof, an extension 25 extending therefrom in the rotational direction of the disk 3. The extension 25 includes a through hole 27 to receive the pad supporting pin 13. The back plate 17 of the claw side pad 16 includes, at a side end thereof, an extension 26 extending therefrom in the rotational direction of the disk 3. The extension 26 includes a through hole 28 for receiving the pad supporting pin 13.

Figure 3:
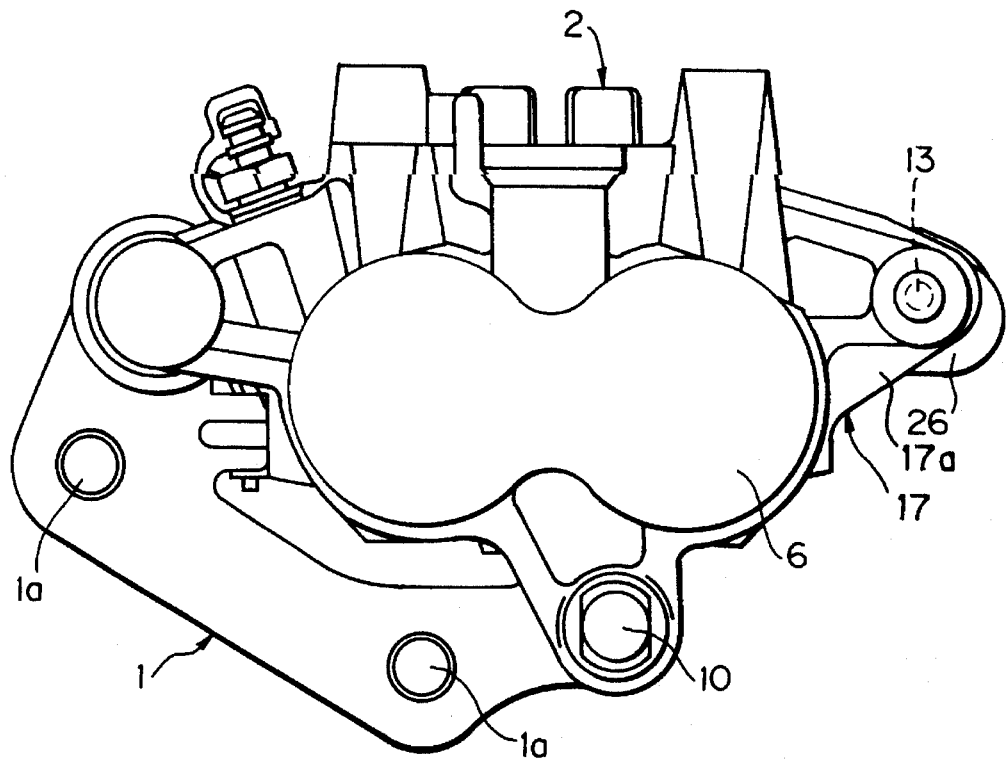
FIG. 3 is a front view illustrating the entire construction of the disk brake.
Figure 4:
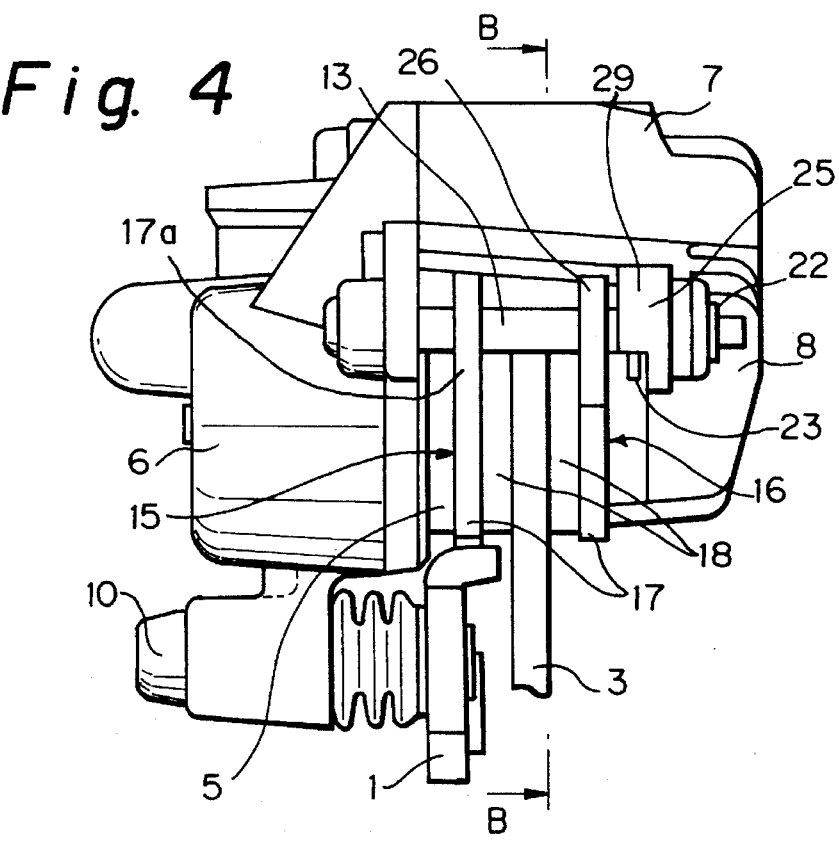
FIG. 4 is a side view illustrating the entire construction of the disk brake.

The back plate 17 of the piston side pad 15 includes at a side end thereof an extension 17a to support the pad supporting pin 13 as shown in FIGS. 3 and 4.

Figure 1:
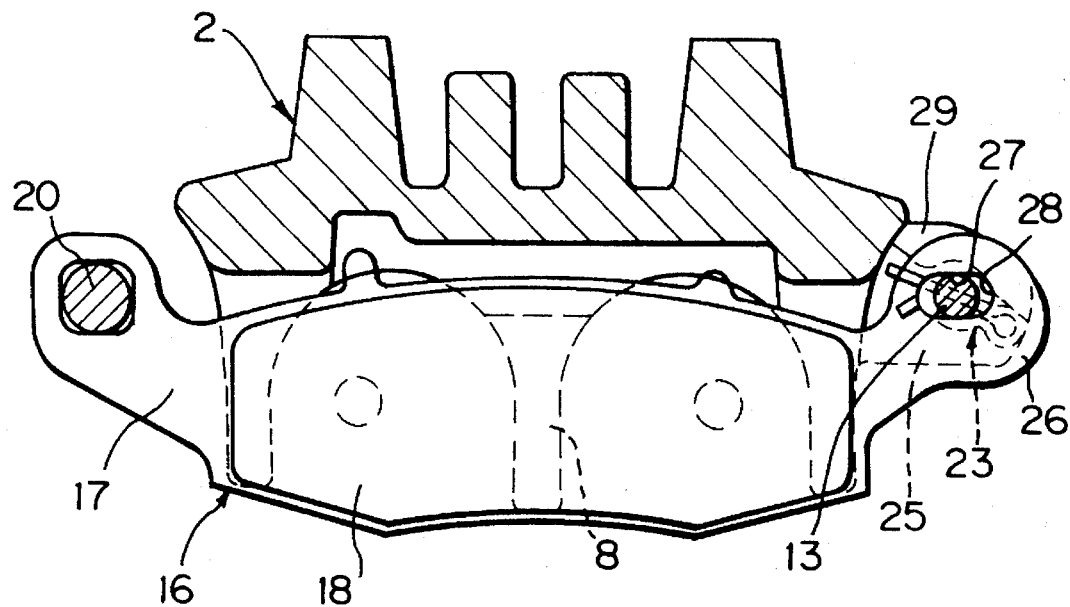
FIG. 1 is a sectional view as seen along line B—B of FIG. 4 illustrating an essential partial construction of a first embodiment of a disk brake according to the present invention.
Figure 2:
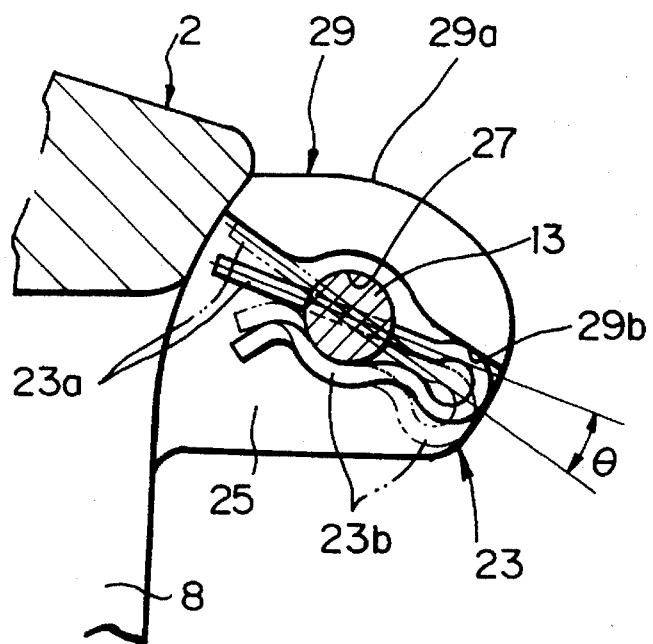
FIG. 2 is a partially enlarged sectional view of FIG. 1.

The pad supporting pin 13 extends from the face of the claw portion 8 (or the extension 25) through the through holes 27 and 28 to the cylinder portion 6. The supporting pin 13 includes at one end thereof the flange 22 to be in contact with the extension 25 of the claw portion 8. The contact of the flange 22 with the extension 25 prevents insertion of the supporting pin 13 into the through hole 27. The assembly manner regarding the supporting pin 13 is the same as that in the disk brake of the related art (shown in FIGS. 10 to 12). The shape and manner of use of the clip 23, preventing removal of the supporting pin 13 from the through hole 27, is also the same as that in the disk brake of the related art. Namely, insertion of the linear portion 23a into the radially extending hole of the supporting pin 13 and engagement of the curved portion 23b with the periphery of the supporting pin 13 prevents removal of the clip 23 from the supporting pin 13 (as shown in FIG. 2).

The extension 25 of the claw portion 8 of the caliper 2 and the extension 26 of the back plate 17 of the pad 16 have sufficient size so that the clip 23 is almost entirely covered with the extensions 25 and 26. The extension 25 of the claw portion 8 includes a projecting portion 29 to cover the upper side of the clip 23. The projecting portion 29 includes an upper surface 29a flush with an upper surface of the extension 25. The projecting portion 29 also includes a lower surface (or contact surface) 29b having an inclined angle to limit rotation of the clip 23 to an angle θ. Incidentally, the extension 25 and the projecting portion 29 are integrally molded with the caliper 2.

In the disk brake constructed as mentioned above, the piston 5 in the cylinder portion 6 and the caliper 2 are moved relative to each other, thereby allowing the pads 15 and 16 to be brought into pressing contact with the disk 3 to prevent its rotation. Since the clip 23 preventing removal of the pad supporting pin 13 from the caliper 2 is covered with the extensions 25 and 26 provided in the claw portion 8 of the caliper 2 and the back plate 17 of the pad 16, respectively, the clip 23 is provided in a blind spot as viewed from the right and left directions outside of the vehicle. Since the clip 23 is also covered with the projecting portion 29 extending from the extensions 25 of the claw portion 8 of the caliper 2, the clip 23 is provided in a blind spot as viewed from the upper outside of the vehicle. Providing the clip 23 in a blind spot allows location of the clip 23 to be difficult from the outside of the vehicle. This also prevents tampering, as by removal of the clip 23, and enhances the design of the disk brake in its outward form.

Figure 5:
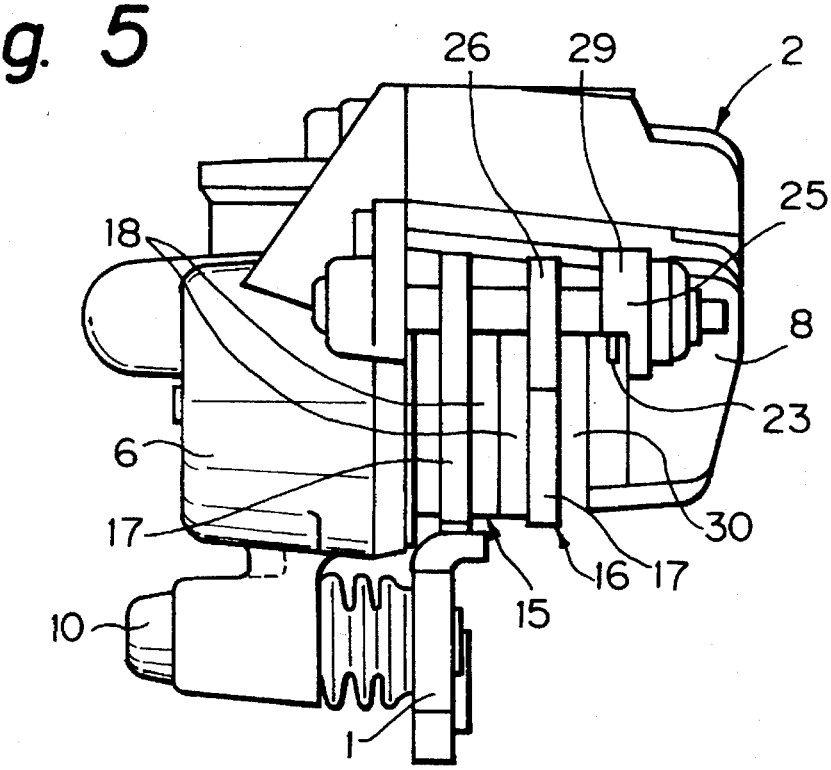
FIG. 5 is a side view illustrating a step in disassembling the disk brake.

When it is required to replace worn pads with new pads for maintaining the disk brake, the caliper 2 and the carrier 1 are removed from the vehicle before the claw side pad 16 is moved toward the piston 5 as shown in FIG. 5, whereby a relatively large gap 30 is defined between the pad 16 and the extension 25 of the claw portion 8. This permits a tool to be inserted into the gap 30 to facilitate removal of this clip 23 from the supporting pin 13. In the embodiment, in particular, since the projecting portion 29 limits rotation of the clip 23 to an angle θ, the clip-removing direction, in which the clip 23 is removed from the supporting pin 13, is not shifted over an opening space defined downwardly of the projecting portion 29, thus ensuring removal of the clip 23. Limitation of rotation of the clip 23 may also be provided by modification of the pin 13 without forming the projecting portion 29. Such a construction requires machining for additionally providing the caliper 2 and the pin 13 with construction limiting rotation of the clip 23, and brings about disadvantages in costs.

As shown in FIG. 6, a disk brake in the second embodiment of the present invention includes a shim 31 for reducing noise on the rear surface of the back plate 17 of the claw side pad 16. In the disk brake including the shim 31, in addition to the construction of the first embodiment, a bent portion 32 bent toward the extension 25 of the claw portion 8 of the caliper 2 can be provided in one end of the shim 31. The bent portion 32 extends therefrom above the side of the extension 25 in spaced and parallel relation to the pin 13. In this case, since the clip 23 is covered with the bent portion 32 with respect to the front or back direction of the vehicle location of the clip 23 from the outside thereof can be more difficult. Incidentally, the reference numeral "31a" shown in FIG. 6 designates thickness of the shim 31.

In the first and second embodiments, insertion of the pad supporting pin 13 into the through holes 27 and 28 of the extensions 25 and 26 from the front side of the claw portion 8 permits the pin 13 to extend therefrom to the cylinder portion 6. The invention is not limited to this construction. The invention may employ a construction in which insertion of the pad supporting pin 13 into the through holes 27 and 28 of the extensions 25 and 26 from the face side of the cylinder portion 6 permits the pin 13 to extend therefrom to the front side of the claw portion 8. In this case, the construction including the extensions 25 and 26, the projecting portion 29 and the clip 23 are provided in the side of the cylinder portion 6. The third embodiment, including such an arrangement, is shown in FIGS. 8 and 9.

In the third embodiment, the cylinder portion 6 includes on the side end thereof an extension 45. The extension 45 includes a through hole (not shown) to receive the pad supporting pin 13. The back plate 17 of the piston side pad 15 includes, on the side end thereof, an extension 46. The extension 46 includes a through hole (not shown) to receive the pad supporting pin 13. As stated above, the pad supporting pin 13 is inserted into the through holes of the extensions 45 and 46 from the face side of the cylinder portion 6. The extension 45 of the cylinder portion 6 includes a projecting portion 49 to cover the upper side of the clip 23. The construction of the extension 45 and the projecting portion 49 is the same as that of the extension 25 and the projecting portion 29 of the first and second embodiments with the exception that they are constructed in mirror image.

According to the invention, the mounting position of the pad supporting pin is changed to the side end of the caliper and the clip prevents removal of the pin. Since the clip is covered with the extensions of the claw portion and the back plate and the projecting portion, locating the clip from the outside of the caliper is difficult, thus preventing removal of the clip. Changing the mounting position of the pad supporting pin to the side end of the caliper permits the rigidity of the upper portion of the caliper to be enhanced and permits the thickness of the caliper to be relatively thin, thereby making the caliper small and light. The construction also makes mounting the pin in a screw-tightening manner unnecessary, thereby decreasing production costs of the caliper. Since the extension of the back plate of the pad serves to radiate heat generated in the back plate by braking, it can control a brake fading phenomenon generated by the pad being heated.

Various other features and advantages of the invention are set forth in the following claims.

What is claimed is:

1. A disk brake for a two-wheeled vehicle, comprising:

a caliper, said caliper comprising a claw portion, said claw portion having a side end, and said side end comprising a first extension that extends outwardly from said side end;

a pair of pads, said pads comprising back plates, one of said back plates having a back plate side end, and said back plate side end comprising a second extension that extends outwardly from said back plate side end;

a pin slidably supporting said pads, said pin being received in said first and second extensions, and said pin having an axis; and a clip provided between said first and second extensions for preventing removal of said pin from said first and second extensions;

wherein said first and second extensions are sized so as to cover opposed lateral sides of said clip that extend in a direction transverse to the axis of said pin; and wherein said first extension further comprises a projecting portion that extends along the axis of said pin so as to cover the outside of said clip.

2. The disk brake of claim 1, wherein:

said pin includes a radially extending hole and a periphery, said clip includes a linear portion inserted into said hole of said pin, a curved portion engaging with the periphery of said pin, and a connecting portion extending between said linear portion and said curved portion, and said connected portion is positioned within a space defined by said first and second extensions and said projecting portion.

3. The disk brake of claim 1, wherein said projecting portion comprises a contact surface for contacting said clip and limiting rotation of said clip to a predetermined angle θ.

4. The disk brake of claim 1, and further comprising:

a noise reducing shim that is fixedly mounted on one of said back plates of one of said pads; and a bent portion on said shim bent toward said first extension and covering the outside of said clip.

5. The disk brake of claim 1, wherein each of said first and second extensions includes a through hole and said pin is inserted into said through holes of said first and second extensions.

6. The disk brake of claim 5, wherein said claw portion comprises a face side and said pin is inserted into said through holes of said first and second extensions from said face side of said claw portion.

7. The disk brake of claim 5, wherein said caliper comprises opposite ends, said claw portion is located at one of said opposite ends on said caliper, a cylinder portion is located at the other of said opposite ends on said caliper, said cylinder portion comprises a face side, and said pin is inserted into said through holes of said first and second extensions from said cylinder portion.

8. The disk of claim 1, wherein said projecting portion projects from said first extension above said pin to said second extension.

9. A disk brake adapted to be mounted on a two-wheeled vehicle that includes a non-rotation portion and a disk having an axis and a rotational direction, comprising:

a carrier fixedly connected to said non-rotation portion of the vehicle;

a caliper supported by said carrier, said caliper comprising a cylinder portion and a claw portion such that said cylinder portion and said claw portion face each other across the disk;

one of said cylinder portion and said claw portion comprising a first side end, said first side end comprising a first extension extending from said first side end in the rotational direction of the disk, and said first extension having a first through hole;

a pair of pads, said pads comprising back plates;

wherein one of said back plates is located adjacent to said one of said cylinder portion and said claw portion and comprises a second side end, said second side end comprising a second extension extending from said second side end in the rotational direction of the disk, and said second extension having a second through hole;

a pin slidably supporting said pads, said pin being inserted into said first and second through holes of said first and second extensions; and a clip provided between said first and second extensions for preventing removal of said pin from said first and second extensions;

wherein said first and second extensions are sized so as to cover opposed lateral sides of said clip that extend in a direction transverse to the axis of the disk; and wherein said first extension further comprises a projecting portion that extends along the axis of the disk so as to cover the outside of said clip in a radial direction of the disk.

10. The disk brake of claim 9, wherein said projecting portion comprises a contact surface for contacting said clip and limiting rotation of said clip to a predetermined angle θ.

11. The disk brake of claim 9, and further comprising:

a noise reducing shim that is fixedly mounted on one of said back plates of one of said pads; and a bent portion on said shim bent toward said first extension and covering the outside of said clip.

12. The disk brake of claim 9, wherein:

said pin includes a radially extending hole and a periphery, said clip includes a linear portion inserted into said hole of said pin, a curved portion engaging with the periphery of said pin, and a connecting portion extending between said linear portion and said curved portion, and said connected portion is positioned within a space defined by said first and second extensions and said projecting portion.

13. The disk of claim 9, wherein said projecting portion projects from said first extension above said pin to said second extension.

14. The disk brake, adapted to be mounted on a two-wheeled vehicle that includes a non-rotation portion and a disk having an axis and a rotational direction, comprising:

a carrier fixedly connected to said non-rotation portion of the vehicle;

a caliper supported by said carrier, said caliper comprising a cylinder portion and a claw portion such that said cylinder portion and said claw portion face each other across the disk;

one of said cylinder portion and said claw portion comprising a first side end, said first side end comprising a first extension extending from said first side end in the rotational direction of the disk, and said first extension having a first through hole;

a pair of pads, said pads comprising back plates;

wherein one of said back plates is located adjacent to said one of said cylinder portion and said claw portion and comprises a second side end, said second side end comprising a second extension extending from said second side end in the rotational direction of the disk, and said second extension having a second through hole;

a pin slidably supporting said pads, said pin being inserted into said first and second through holes of said first and second extensions;

a clip provided between said first and second extensions for preventing removal of said pin from said first and second extensions;

wherein said first and second extensions define a means for covering opposed lateral sides of said clip that extend in a direction transverse to the axis of the disk; and a projecting portion that projects from one of said first and second extensions toward the other of said first and second extensions along the axis of the disk and defines a means for covering the outside of said clip at least to the extent that said clip is hidden from view from above.

* * * * *